UNITED STATES PATENT OFFICE 2,548,982

POLYARYL POLYPARAFFINS

Woodrow Ernest Kemp, Montreal, Quebec, Canada, assignor to Dominion Tar & Chemical Company Limited, Montreal, Quebec, Canada No Drawing. Application March 18, 1949, Serial No. 82,265

4 Claims. (Cl. 260—668)

This invention relates to polyaryl hydrocarbons and more particularly, to polyarylpolyethanes and processes of producing them.

In the past diary paraffins, and more particularly diarylethanes, have been prepared by reaction of hydrocarbons such as toluene and xylene with acetylene and more recently, by condensation of a hydrocarbon such as toluene or xylene with a carbonyl compound such as acetaldehyde in the presence of hydrogen fluoride or a mixture of hydrogen fluoride and fluosulfonic acid as the condensation catalyst. The process involving the use of hydrogen fluoride is described and claimed in the Sturrock, Lawe and Kemp U. S. Patent No. 2,439,228, while the use of the mixture of hydrogen fluoride and fluosulfonic acid is described and claimed in my copending application Serial No. 771,154, filed August 28, 1947, of which this is a continuation-in-part.

It is an object of the present invention to prepare polyaryl polyparaffins.

Another object of the present invention is the preparation of polyarylpolyethanes.

A further object of the present invention is the preparation of triaryldiethanes and tetraaryltriethanes.

Still another object of the present invention is the preparation of new chemical compounds having the following general formula:

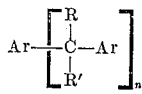

where Ar is an aryl radical of the benzene or naphthalene series, R is an alkyl group of 1–3 carbon atoms, R' is hydrogen or a methyl group, and $n$ is 2 or 3.

A further, more specific object of the present invention is the preparation of new chemical compounds having the general formula:

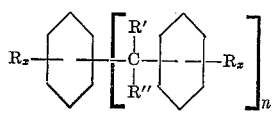

in which R is a methyl or hydroxyl radical or an halogen atom, R' is an alkyl radical of from 1–3 carbon atoms, R" is hydrogen or a methyl group, $x$ is zero, 1 or 2, and $n$ is 2 or 3.

It is another object of the present invention to prepare trixylyldiethane and tetraxylyltriethane.

The above and other objects are attained by condensing suitable proportions of an aromatic hydrocarbon or substitution product thereof with a carbonyl compound such as a ketone or an aldehyde or with acetylene or a substituted acetylene in the presence of an appropriate condensing agent.

The invention will be described in greater detail in conjunction with the following specific examples in which proportions are given in parts by weight. It should be understood that these examples are merely illustrative, and it is not intended that they should limit the scope of the invention.

Example 1

74.6 parts (0.7 mol) of xylene (containing 58.5% m-xylene)
4.4 parts (0.1 mol) of acetaldehyde
18.9 parts of anhydrous hydrogen fluoride
2.1 parts of water The acetaldehyde is added slowly to a mixture of the xylene, hydrogen fluoride and water in a suitable vessel equipped with means for refluxing, care being taken that the temperature does not rise sufficiently high to boil off any hydrogen fluoride or acetaldehyde vapors. The reaction mixture separates into two layers which are separated, and the organic layer is washed with water to remove acid therefrom and then distilled. 70 parts of unreacted xylene, 28 parts of 1,1-di-(2,4-xylyl) ethane and 2 parts of a high-boiling fraction are obtained.

The high-boiling fraction is vacuum distilled and found to boil at 237°–242° C. at 2.5–3.0 mm. Hg. The product, which is tri-(2,4-xylyl)-1,1-diethane, is soluble in common organic solvents and can be readily recrystallized by addition of water to solutions in acetone or alcohol. It is a white solid with no fluorescence and analyses as follows:

|  | Theory for $C_{28}H_{34}$ | Found |
| --- | --- | --- |
| Molecular Weight | 370.5 | 368.6 |
| Per Cent C | 90.74 | 90.10 |
| Per Cent H | 9.26 | 9.08 |
| Melting Point °C |  | 116–118 |

Example 2

(1) 476 parts (2 mols) of dixylylethane
(2) 194 parts of chlorobenzene
(3) 108 parts of anhydrous hydrofluoric acid
(4) 6 parts of water
(5) 22 parts (0.5 mol as $CH_3CHO$) of paraldehyde
(6) 44 parts of chlorobenzene (1), (2), (3) and (4) are charged into a suitable vessel and (5) and (6) are added at such a rate that the temperature does not exceed 8°

C. The reaction mixture is agitated for 35 minutes after the addition is complete and is then discharged into ice water. The two layers which form are separated, and the organic layer is washed thoroughly with water and alkali. The chlorobenzene solvent is removed by vacuum distillation after which there are recovered 257 parts of unreacted dixylylethane, 74 parts of trixylyldiethane boiling at 262° C. at 10 mm. Hg, and 79 parts of tetraxylyltriethane boiling at 324° C. at 10 mm. Hg. This represents a yield, based on dicylylethane, of 33% of the tri-compound and of 34% of the tetra-compound.

The desired reaction

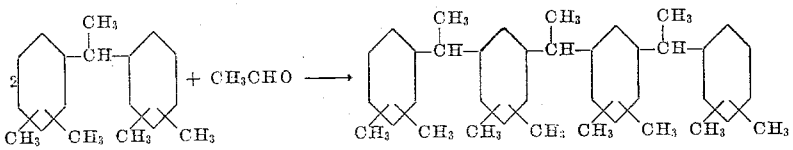

is apparently complicated to some extent by the following rearrangement:

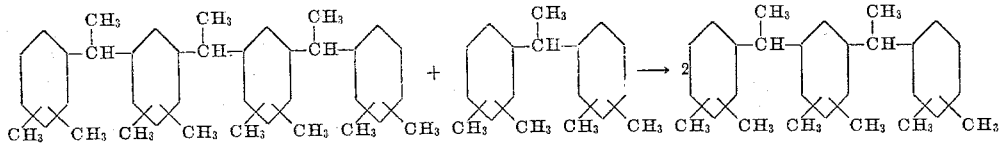

Dixylylethane used in this and following examples may be prepared by condensation of xylene and acetaldehyde in the presence of hydrofluoric acid or of a mixture of hydrofluoric acid and fluosulfonic acid as described in the Sturrock, Lawe and Kemp patent and my copending application referred to above.

*Example 3*

(1) 770 parts of concentrated sulfuric acid
(2) 476 parts (2 mols) of dixylylethane
(3) 476 parts of chlorobenzene
(4) 22 parts (0.5 mol as CH₃CHO) of paraldehyde (1) is charged into a suitable reaction vessel and (2), (3), and (4) are added at such a rate that the reaction temperature never exceeds 10° C. After addition is complete, agitation is continued for 30 minutes.

The reaction product is separated and washed as in Example 2, making use of liberal quantities of benzene and sodium sulfate to counteract the tendency of the mixture to emulsify. Upon fractionation are obtained 155 parts of unreacted dixylylethane, 148 parts of trixylyldiethane and 56 parts of tetraxylyltriethane.

It will be noted that a higher proportion of the tri-compound is formed than in Example 2 when hydrofluoric acid is used as the catalyst.

*Example 4*

952 parts (4 mols) of dixylylethane
388 parts of chlorobenzene
432 parts of hydrofluoric acid
24 parts of water.
88 parts (2 mols as CH₃CHO) of paraldehyde
88 parts of chlorobenzene The procedure of Example 2 is followed, the reaction temperature being held to 3° C. and agitation after addition of reactants continuing for 30 minutes.

307 parts of unreacted dixylylethane, 176 parts of trixylyldiethane, 318 parts of tetraxylyltriethane and 130 parts of residue are obtained, this representing a yield, based on dixylylethane, of 26% tri-compound and 47% tetra-compound.

It will be seen by comparing the results of this example with those of Example 2 that the proportion of tetra-compound to tri-compound formed in the reaction can be increased by using excess acetaldehyde.

*Example 5*

6.9 parts (0.09 mol) of benzene
1.0 part (0.02 mol as CH₃CHO) of paraldehyde
1.1 parts of fluosulfonic acid
6.2 parts of hydrogen fluoride The ingredients are condensed, according to the procedure of the preceding examples, in a copper vessel. The condensation product, after separation and washing, is vacuum distilled to yield 1,1-diphenylethane, triphenyldiethane and tetraphenyltriethane in a weight ratio of 54:20:26, respectively.

*Example 6*

5.6 parts (0.07 mol) of benzene
1.0 part (0.02 mol as CH₃CHO) of paraldehyde
1.1 parts of fluosulfonic acid
3.5 parts of hydrogen fluoride Example 5 is repeated and the weight ratio of products obtained is 27:43:30. Thus it will be seen that formation of the desired tri- and tetra-compounds is favored by the slightly different concentration of condensing agent and increased proportion of aldehyde.

*Example 7*

16.9 parts (0.2 mol) of toluene
1.4 parts (0.03 mol) of acetaldehyde
4.3 parts of hydrogen fluoride The procedure of the foregoing examples is followed, and the separated and washed reaction product is vacuum distilled. Three fractions are obtained: 10.6 parts of unreacted toluene, 5.4 parts of ditolylethane, and 0.1 part of tritolyldiethane.

*Example 8*

1.8 parts anhydrous aluminum chloride
72.7 parts (0.5 mol) o-dichlorobenzene
2.8 parts (0.1 mol) acetylene
0.4 part anhydrous hydrogen fluoride The procedure of the foregoing examples is followed, the acetylene being substituted for acetaldehyde or paraldehyde, and three fractions are obtained: 50.2 parts of unreacted o-dichlorobenzene, 17.7 parts of 1,1-di(o-dichlorophenyl)ethane, and 6.13 parts of tri(o-dichlorophenyl)diethane.

*Example 9*

16 parts (0.1 mol) of chlorobenzene and from 0.1–0.4 part of anhydrous aluminum chloride are charged into a reaction flask and heated to 75° C. Stirring is started, and anhydrous hydrogen chloride is slowly added. When the chlorobenzene is saturated, as evidenced by a white mist coming off the liquid, acetylene is added gradually over a period of from 2-3 hours. Nitrogen is then run through the mix to remove the unreacted acetylene and a mixture of hydrochloric acid, ice and water is added to extract the aluminum chloride.

The reaction product is washed thoroughly and then vacuum distilled, first at 100 mm. Hg to remove unreacted chlorobenzene and then at 20 mm. Hg. Two fractions are obtained, one representing a 65%–75% yield of 1,1-bis(chlorophenyl) ethane, based on the chlorobenzene, and the other a 30%–40% yield of tri(chlorophenyl) diethane, based on the yield of 1,1-bis(chlorophenyl) ethane.

*Example 10*

85 parts (0.7 mol) of naphthalene
258 parts of chlorobenzene
4.3 parts (0.1 mol as CH₃CHO) of paraldehyde
68 parts of anhydrous hydrogen fluoride The procedure of the foregoing examples is followed, and the following products are obtained:

245 parts of unreacted chlorobenzene
56 parts of unreacted naphthalene
22 parts of 1,1-dinaphthylethane
6.8 parts of trinaphthyldiethane As stated above the compounds contemplated by the present invention may be represented by the formula:

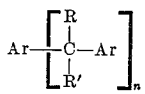

The Ar in this formula may be a hydrocarbon of the benzene series having from 6–8 carbon atoms, i. e., benzene, toluene, the xylenes or ethyl benzene, or it may be naphthalene. Any one of these hydrocarbons may be substituted as, for example, with halogen atoms, hydroxyl groups, amino or substituted amino groups, cyano groups, isocyanate groups, sulfonic acid groups and the like. Suitable substituted hydrocarbons, therefore, include chlorobenzene, 1,3 - dimethyl - 2 - bromobenzene, phenol, aniline, N,N-dimethyltoluidine, 1,2-dimethyl-4-cyanobenzene, benzene isocyanate, 4 - ethylbenzenesulfonic acid, α-methylnaphthalene, and the like.

The most reactive aryl compounds are those having nuclear methyl substituents. Benzene itself is much less active than toluene or any of the xylene isomers. The reactivity of the chloro-substituted aryl compounds is low in comparison with the activity of the methyl-substituted aryl compounds which accounts for the use of chlorobenzene as a solvent in Examples 2–4 and of o-dichlorbenzene as a reactant in Example 8.

Aliphatic saturated organic compounds consisting of carbon, hydrogen and oxygen atoms having a carbonyl group and having at least two carbon atoms are suitable for use in accordance with my invention. Among these the aldehydes having at least two carbon atoms and the ketones having relatively short chain alkyl groups, preferably straight chains, are especially suitable. Some examples of these include acetone, methyl ethyl ketone, methyl propyl ketone, acetaldehyde, propionaldehyde and butyraldehyde. The aldehydes and ketones having no more than five carbon atoms are preferred. Fluid acetaldehyde, including acetaldehyde itself and paraldehyde, may be used because of its relatively high boiling point which enables one to carry out the reaction easily at atmospheric pressure. Acetaldehyde itself may be used without difficulty if the temperature be sufficiently low and/or if the pressure be sufficiently high to avoid undue loss of the acetaldehyde.

Substituted acetylenes such as methyl acetylene may be used in the process of my invention in place of the acetylene of Example 8. In this case aryl substituted propanes rather than ethanes are produced.

If desired, a diarylparaffin such as dixylylethane may be condensed with a carbonyl compound or with acetylene to produce the desired corresponding polyaryl polyparaffin.

Various strong acid condensing agents may be used in the preparation of the new products of my invention. These include anhydrous hydrogen fluoride, concentrated sulfuric acid, hydrofluoric acid, mixtures of hydrogen fluoride with fluosulfonic acid, and the like. The use of hydrogen fluoride or a mixture thereof with fluosulfonic acid is preferred.

Relative proportions of the aromatic compound and the carbonyl compound or acetylene with which it is reacted may be varied. There must be provided at least three of the basic aryl groups for every two of the basic paraffin groups. When, for example, xylene is reacted with acetaldehyde, a molar ratio of at least 3:2 based on acetaldehyde becomes 3:0.67 based on paraldehyde. Similarly, when, for example, dixylylethane is reacted with acetaldehyde, a molar ratio of 3:1, dixylylethane:acetaldehyde, corresponds to a 6:4 or 3:2 molar ratio based on xylyl and CH₃C< groups, respectively. The only top limit on proportions of reactants is a practical one; I have used from 1.6:1 to 7:1, basic aryl groups: basic paraffin groups, in the examples.

If desired, inert solvents may be employed in the preparation of my new compounds. Examples of these are chlorinated solvents such as chloroform, carbon tetrachloride, etc., saturated paraffins such as cyclohexane, etc., and the like.

The reaction forming the products of the present invention may be carried out at temperatures ranging from about —20° C. up to about 65° C. or higher. Generally we find that the reaction is preferably carried out in the neighborhood of 0° C. until after the initial condensation has taken place.

The new compounds of the present invention may be cracked catalytically in vapor phase in accordance with processes described in U. S. Patents Nos. 2,373,982, 2,420,688, 2,420,689, 2,422,-163, 2,422,164, 2,422,165, 2,422,169, 2,422,171, and 2,422,318. The products, as in the processes of the above-mentioned patents, may include substituted styrenes. However, as fully set forth in the copending application of Thomas Lawe, Serial No. 82,269, filed March 18, 1949, entitled "Processes for Cracking Polyaryl Polyparaffins," my new polyarylpolyethanes produce upon cracking a higher relative proportion of substituted styrene than do the diarylethanes previously used.

The compounds of the present invention are also useful as electric insulating media in electric condensers and as dielectric media generally. Many of them also find use as wetting agents.

I claim:

1. As new chemical compounds, those having the general formula:

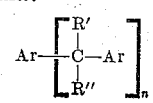

in which Ar is selected from the group consisting of aromatic radicals of the naphthalene series and of the benzene series having from 6–8 carbon atoms, R' is an alkyl radical of from 1 to 3 carbon atoms, R" is selected from the group consisting of hydrogen and methyl, and $n$ is an integer selected from the group consisting of 2 and 3.

2. As a new chemical compound, that having the formula:

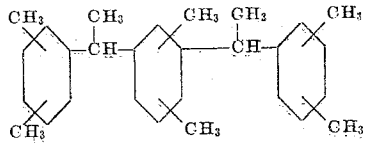

3. As a new chemical compound, that having the formula:

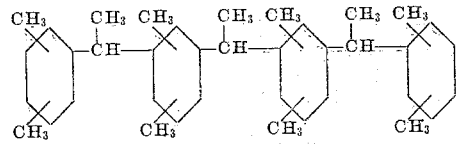

4. A process which comprises condensing an aromatic compound selected from the group consisting of aromatic compounds of the naphthalene series and of the benzene series having from 6–8 carbon atoms with an aliphatic compound of the formula:

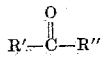

wherein R' is an alkyl radical of from 1 to 3 carbon atoms and R" is selected from the group consisting of hydrogen and methyl, at least three mols of said aromatic compound being provided for every two mols of said aliphatic compound, in the presence of an acid condensing agent, and separating from the reaction mixture the so-obtained polyaryl polyparaffin of the formula:

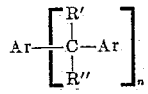

in which Ar is selected from the group consisting of aromatic radicals of the napthalene series and of the benzene series having from 6–8 carbon atoms, R' and R" are as above and $n$ is an integer selected from the group consisting of 2 and 3.

WOODROW ERNEST KEMP.

REFERENCES CITED

The following references are of record in the file of this patent:

UNITED STATES PATENTS

| Number | Name | Date |
|---|---|---|
| 2,075,144 | Schneider | Mar. 30, 1937 |
| 2,139,231 | Hentrich et al. | Dec. 6, 1938 |
| 2,464,207 | Bender et al. | Mar. 15, 1949 |